United States Patent
Baek

(10) Patent No.: US 8,582,269 B2
(45) Date of Patent: Nov. 12, 2013

(54) OVERCURRENT PROTECTION APPARATUS FOR SECONDARY BATTERY, PROTECTION METHOD AND BATTERY PACK

(75) Inventor: Seongmun Baek, Anyang-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/469,876

(22) Filed: May 11, 2012

(65) Prior Publication Data

US 2013/0033794 A1    Feb. 7, 2013

Related U.S. Application Data

(63) Continuation of application No. PCT/KR2012/002483, filed on Apr. 3, 2012.

(30) Foreign Application Priority Data

Aug. 4, 2011    (KR) .................. 10-2011-0077766

(51) Int. Cl.
    *H02H 5/04*    (2006.01)
(52) U.S. Cl.
    USPC ............................... 361/93.9; 361/23
(58) Field of Classification Search
    USPC ............................ 361/18, 23, 93.9
    See application file for complete search history.

(56) References Cited

U.S. PATENT DOCUMENTS

2005/0269981 A1* 12/2005 Sakurai .................. 318/139
2008/0143462 A1* 6/2008 Belisle et al. ............ 335/201
2010/0127663 A1  5/2010 Furukawa et al.
2010/0254046 A1* 10/2010 Liu et al. .................. 361/8
2013/0050880 A1* 2/2013 Rozman et al. ........... 361/18

FOREIGN PATENT DOCUMENTS

| JP | 64-50768 A | 2/1989 |
| JP | 2008-99528 A | 4/2008 |
| KR | 10-0184799 B1 | 5/1999 |
| KR | 10-2010-0059685 A | 6/2010 |
| KR | 10-2011-0037058 A | 4/2011 |

OTHER PUBLICATIONS

International Search Report (Form PCT/ISA/210) for International Application No. PCT/KR2012/002483, dated Oct. 25, 2012.
Office Action for Korean Application No. 10-2011-0077766, dated Oct. 30, 2012.
Written Opinion of the International Searching Authority (Form PCT/ISA/237) for International Application No. PCT/KR2012/002483, dated Oct. 25, 2012.

* cited by examiner

*Primary Examiner* — Danny Nguyen
(74) *Attorney, Agent, or Firm* — Birch, Stewart, Kolasch & Birch, LLP

(57) ABSTRACT

An overcurrent protection apparatus for a secondary battery includes a main relay, an auxiliary relay connected in parallel with the main relay, a current limiting resistor connected in series with the auxiliary relay and a controller for detecting an overcurrent and protect the battery module. The controller turns on the main relay and turns off the auxiliary relay in a normal state where the battery module is recharged by the generator. When the overcurrent is detected, the controller turns on the auxiliary relay and turn off the main relay so that a limited current flows through the current limiting resistor.

16 Claims, 3 Drawing Sheets

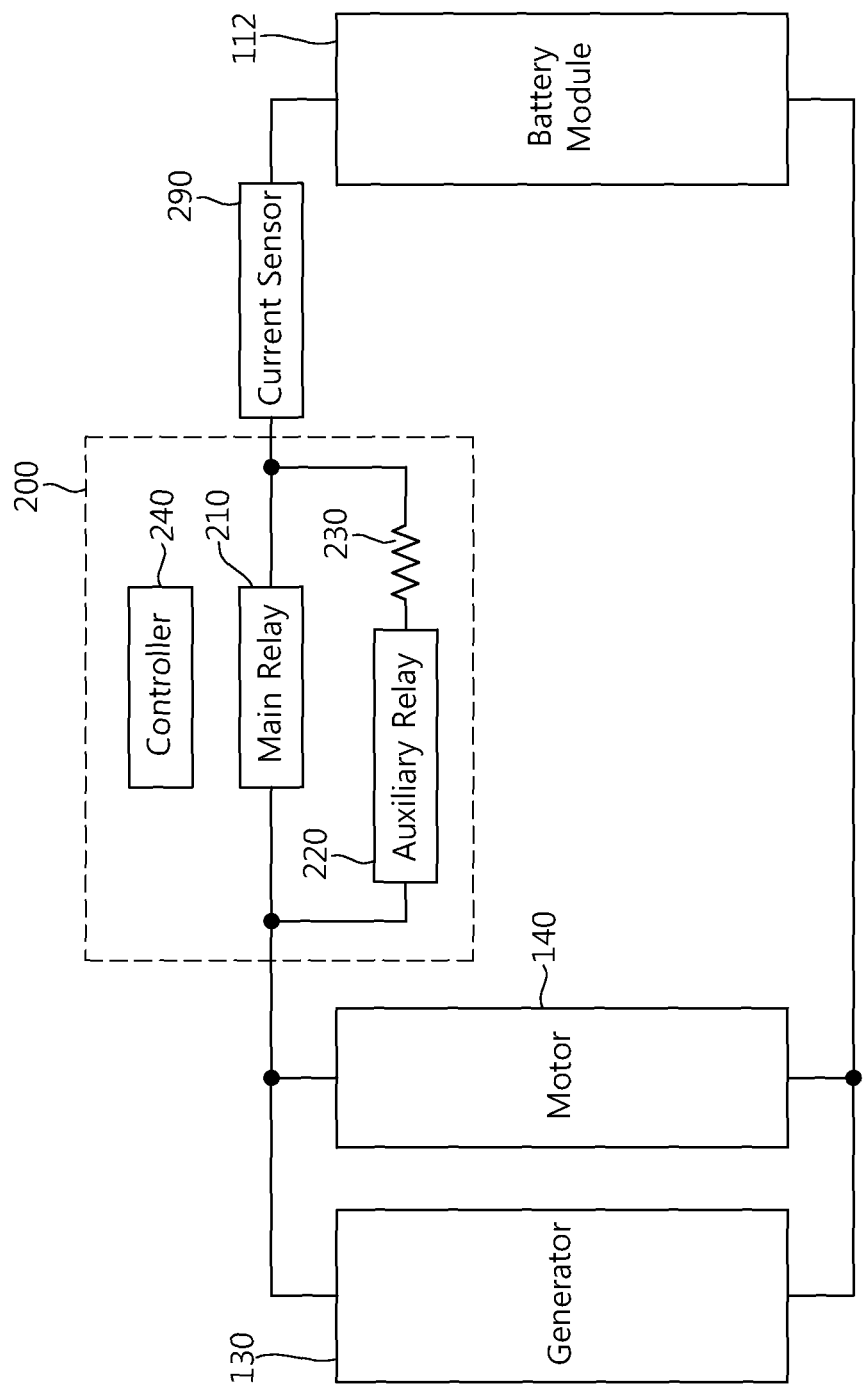

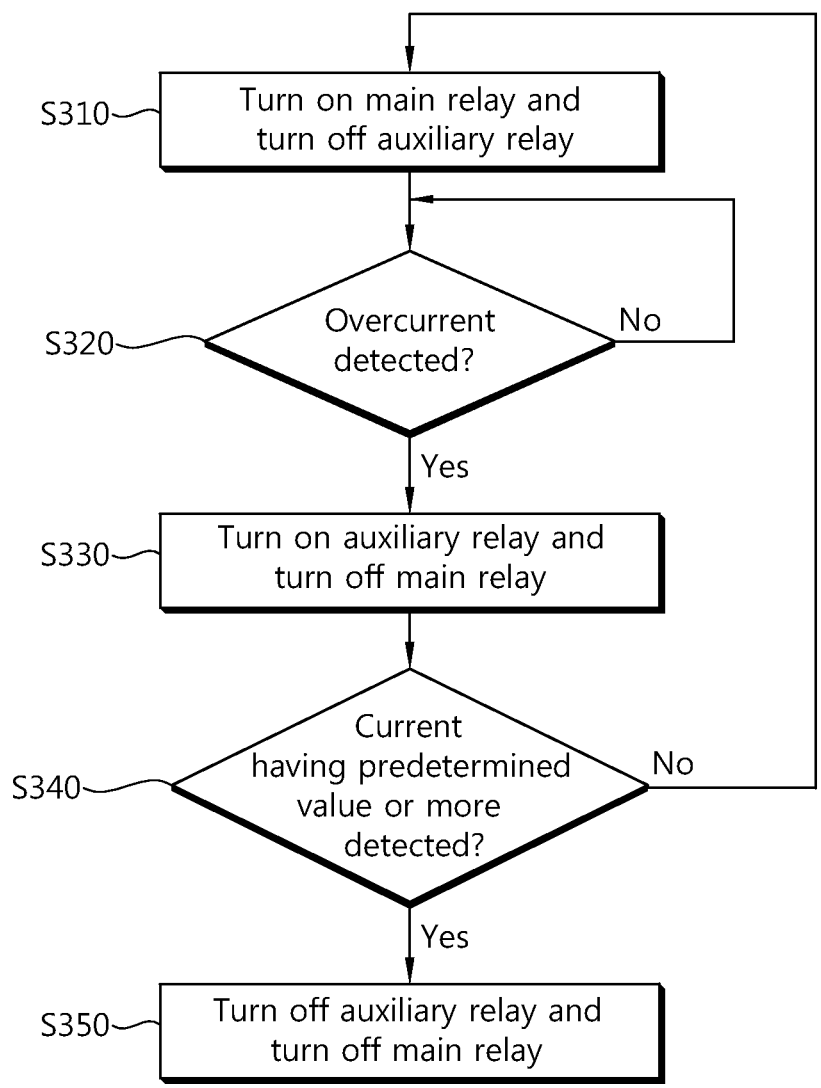

OVERCURRENT PROTECTION APPARATUS FOR SECONDARY BATTERY, PROTECTION METHOD AND BATTERY PACK

TECHNICAL FIELD

This application is a Continuation of PCT International Application No. PCT/KR2012/002483 filed on Apr. 3, 2012, which claims the benefit of Patent Application No. 10-2011-0077766 filed in Korea on Aug. 4, 2011. The entire contents of all of the above applications is hereby incorporated by reference.

The present invention relates to secondary batteries, and more specifically to an overcurrent protection apparatus for a secondary battery, a protection method, and a battery pack.

BACKGROUND

Wide use of mobile devices, such as video cameras, mobile phones, or portable PCs, increases adoption of secondary batteries as a driving power source. Due to high energy density per unit weight and quick recharging capability, lithium-based secondary batteries draw much attention compared to other types including existing Pb batteries, Ni—Ca batteries, Ni—H batteries, or Ni—Zn batteries.

Unlike primary batteries without recharging capability, secondary batteries can be recharged or discharged. In expectancy of various applications, a lot of research efforts have been dedicated to the secondary batteries. Among others, lithium-based secondary batteries exhibit higher operating voltage and per-unit energy density.

Such lithium-based secondary batteries can be classified into lithium ion batteries and lithium ion polymer batteries. The former type adopts liquid electrolyte, and the latter adopts solid polymer electrolyte. Depending on the type of solid polymer electrolyte, the lithium ion polymer batteries can be separated into a full solid type with no electrolyte liquid and a gel polymer type with slight liquid electrolyte.

Subjected to overvoltage or overcurrent state, the secondary batteries cannot guarantee stability, and various efforts are thus attempted to sense and protect such negative situation.

Korean Patent Application Publication No. 2005-72276 discloses a "overvoltage and overcurrent preventing circuit for terminals" which shields overcurrent by a diode and a comparison circuit.

Korean Patent Application Publication No. 2011-54965 discloses a "one-chip battery protecting apparatus" which uses an LDMOS (Laterally Diffused Metal Oxide Semiconductor) to implement a power-off circuit.

In general, secondary batteries used for electric vehicles need to provide a high current ranging from 100 A to 300 A. Accordingly, there is a need for preventing a high-capability secondary battery from being damaged due to overcurrent.

DETAILED DESCRIPTION

Technical Problem

The present invention provides an overcurrent protection apparatus for a secondary battery using a plurality of relays.

The present invention also provides an overcurrent protection method for a secondary battery using a plurality of relays.

The present invention also provides a battery pack using the overcurrent protection apparatus using a plurality of relays,

Technical Solution

In an aspect, an overcurrent protection apparatus for a secondary battery includes a main relay configured to primarily turn on/off a connection between a battery module and a generator, an auxiliary relay configured to secondarily turn on/off a connection the battery module and the generator, the auxiliary relay connected in parallel with the main relay, a current limiting resistor connected in series with the auxiliary relay, and a controller. The controller is configured to detect an overcurrent and protect the battery module, turn on the main relay and turn off the auxiliary relay in a normal state where the battery module is recharged by the generator, and when the overcurrent is detected, turn on the auxiliary relay and turn off the main relay so that a limited current flows through the current limiting resistor.

When detecting a current having a predetermined value or more during a predetermined time after the auxiliary relay turns on, the controller may be configured to turn off the auxiliary relay.

The current limiting resistor may have a varying resistance.

The resistance of the current limiting resistor may range from $10\Omega$ to $100\Omega$.

The battery module may include a plurality of secondary battery cells, and wherein a capacity of the battery module may range from 100 A to 300 A.

In another aspect, an overcurrent protection method for a secondary battery includes primarily turning on a main relay and secondarily turning off an auxiliary relay in a normal state where a battery module is recharged by a generator, wherein the main relay primarily turns on/off a connection between the battery module and the generator, and the auxiliary relay secondarily turns on/off a connection the battery module and the generator, detecting an overcurrent between the battery module and the generator, and turning on the auxiliary relay and then turning off the main relay when the overcurrent is detected so that a limited current flows through a current limiting resistor.

In still another aspect, a battery pack includes a battery module including a plurality of secondary battery cells, and a battery managing module configured to monitor a recharging state of the battery module and protect damage due to an overcurrent from the battery module. The battery managing module includes a main relay configured to primarily turn on/off a connection between a battery module and a generator, an auxiliary relay configured to secondarily turn on/off a connection the battery module and the generator, the auxiliary relay connected in parallel with the main relay, a current limiting resistor connected in series with the auxiliary relay, and a controller. The control is configured to detect an overcurrent and protect the battery module, turn on the main relay and turn off the auxiliary relay in a normal state where the battery module is recharged by the generator, and when the overcurrent is detected, turn on the auxiliary relay and turn off the main relay so that a limited current flows through the current limiting resistor.

Advantageous Effects

When overcurrent is detected, the magnitude of current can be sequentially reduced thus preventing power from being completely shielded due to temporary overcurrent.

DESCRIPTION OF DRAWINGS

FIG. 2 is a block diagram illustrating an overcurrent protection apparatus according to an embodiment of the present invention.

FIG. 3 is a flowchart illustrating an overcurrent protection method according to an embodiment of the present invention.

MODE FOR INVENTION

Figure 1:
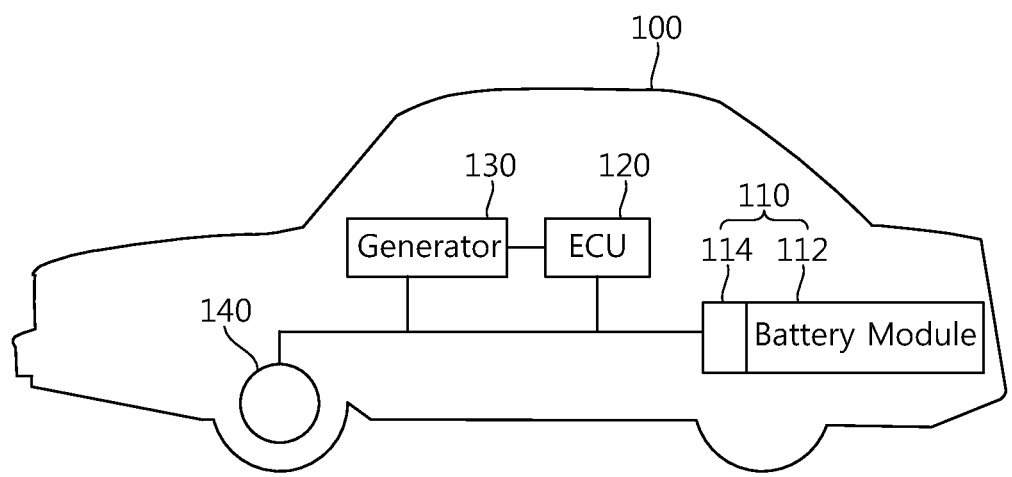
FIG. 1 is a block diagram illustrating an electric vehicle according to an embodiment of the present invention.

An electric vehicle refers to a car that includes one or more electric motors to provide driving force. The driving force is obtained from an electrical source, such as a rechargeable battery and/or fuel cell battery. The electric vehicle may be a hybrid car that includes a combustion engine as another driving source.

FIG. 1 is a block diagram illustrating an electric vehicle according to an embodiment of the present invention.

The electric vehicle 100 includes a battery pack 110, an ECU (Electronic Control Unit) 120, a generator 130, and a motor 140.

The battery pack 110 is used as an electrical rechargeable source for driving the electric vehicle 100. The battery pack 110 provides a driving force to the motor 140 which corresponds to a load, and as the motor 140 and/or a combustion engine (not shown) operates, may be recharged by the generator 130. The battery pack 110 may have capacity ranging from 100 A to 300 A.

The battery pack 110 includes a battery module 112 including a plurality of secondary battery cells and a battery managing module 114 for monitoring a recharging state of the battery module 112. The battery managing module 114 may include an overcurrent protection apparatus (200 of FIG. 2) that prevents any damage due to overcurrent from the battery module 112.

The ECU 120 is an electrical control device that controls a state of the electric vehicle 100.

As the motor 140 and/or combustion engine operates, the generator 130 recharges the battery pack 110.

FIG. 2 is a block diagram illustrating an overcurrent protection apparatus according to an embodiment of the present invention.

The overcurrent protection apparatus 200 includes a main relay 210, a secondary relay 220, a current limiting resistor 230, and a controller 240.

The main relay 210 primarily turns on/off a connection between the battery module 112 and the generator 130 and/or the motor 140. The secondary relay 220 secondarily turns on/off a connection between the battery module 112 and the generator 130 and/or the motor 140. As used herein, the term "turn off" or "OFF" refers to a situation where the two corresponding elements are disconnected from each other, and the term "turn on" or "ON" refers to a situation where the two corresponding elements are connected.

The current limiting resistor 230 is connected in series to the secondary relay 220. The secondary relay 220 and the current limiting resistor 230 are connected in parallel with the main relay 210. For example, when the main relay 210 turns off and the secondary relay 220 turns on, a current flows through the secondary relay 220 and the current limiting resistor 230.

The current limiting resistor 230 may vary depending on situation.

The current limiting resistor 230 may have a resistance between 10Ω and 100Ω.

The current sensor 290 measures a current flowing between the battery module 112 and the generator 130 and/or the motor 140. The current sensor 290 may be part of the battery pack 110 or may be provided outside the battery pack 110.

The controller 240 detects whether overcurrent occurs based on the measured current, and when overcurrent is detected, protects the battery module 112 from the overcurrent.

When the battery module 112 is recharged by the generator 130 or the motor 140 is operated by the battery module 112, under a normal state where normal current flows, the controller 240 turns on the main relay 210 and turns off the secondary relay 220.

When overcurrent is detected, the controller 240 turns on the secondary relay 220 and then turns off the main relay 210. Accordingly, a current limited by the current limiting resistor 230 flows. For example, the current limiting resistor 230 reduces the current flowing through the secondary relay 220.

When a current having a predetermined value or more is detected during a predetermined time after the secondary relay 220 turns on, the controller 240 turns off the secondary relay 220 as well to shield current flowing into the battery module 112.

When overcurrent is detected, the controller 240 reduces the magnitude of the current through the current limiting resistor 230. If the current is not reduced even after a predetermined time, the controller 240 completely shields the current flowing into the battery module 112. Accordingly, even when overcurrent is detected, reduced current may continue to flow during a predetermined time without the battery module 112 being fully cut off.

According to an embodiment, an additional auxiliary relay may be included. For purposes of illustration, the secondary relay 220 is referred to as a first auxiliary relay, and the current limiting resistor 230 is referred to as a first current limiting resistor. A second auxiliary relay and a second current limiting resistor may be connected in parallel with the first auxiliary relay and the first current limiting resistor. When overcurrent is detected, the auxiliary relays are sequentially turned on to sequentially reduce the current.

Although FIG. 2 illustrates the overcurrent protection apparatus 200 is part of the battery pack 110, the overcurrent protection apparatus 200 may be independently provided outside the battery pack 110. The ECU 120 may function as the controller 240 of the overcurrent protection apparatus 200.

FIG. 3 is a flowchart illustrating an overcurrent protection method according to an embodiment of the present invention. This method may be performed by the overcurrent protection apparatus 200 illustrated in FIG. 2.

In a normal state, the main relay turns on, and the auxiliary relay turns off (S310). In the normal state, the battery module is recharged by the generator, or when the motor is operated by the battery module, normal current flows.

The controller detects overcurrent between the battery module and generator/motor (S320).

When overcurrent is detected, the controller turns on the auxiliary relay and then turns off the main relay (S330). A current limited by the current limiting resistor flows.

The controller identifies whether during a predetermined time after the auxiliary relay turns on, current having a predetermined value or more is detected (S340).

When the current having the predetermined value or more is detected, the controller turns off the auxiliary relay (S350). When no current having the predetermined value or more is detected, the procedure returns to the normal state.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. An overcurrent protection apparatus for a secondary battery, comprising:
    a main relay configured to primarily turn on/off a connection between a battery module and a generator;
    an auxiliary relay configured to secondarily turn on/off a connection the battery module and the generator, the auxiliary relay connected in parallel with the main relay;
    a current limiting resistor connected in series with the auxiliary relay; and
    a controller configured to:
        detect an overcurrent and protect the battery module,
        turn on the main relay and turn off the auxiliary relay in a normal state where the battery module is recharged by the generator, and
        when the overcurrent is detected, turn on the auxiliary relay and turn off the main relay so that a limited current flows through the current limiting resistor.

2. The overcurrent protection apparatus of claim 1, wherein when detecting a current having a predetermined value or more during a predetermined time after the auxiliary relay turns on, the controller is configured to turn off the auxiliary relay.

3. The overcurrent protection apparatus of claim 1, wherein the current limiting resistor has a varying resistance.

4. The overcurrent protection apparatus of claim 1, wherein the resistance of the current limiting resistor ranges from $10\Omega$ to $100\Omega$.

5. The overcurrent protection apparatus of claim 1, wherein the battery module includes a plurality of secondary battery cells, and wherein a capacity of the battery module ranges from 100 A to 300 A.

6. An overcurrent protection method for a secondary battery, the method comprising:
    primarily turning on a main relay and secondarily turning off an auxiliary relay in a normal state where a battery module is recharged by a generator, wherein the main relay primarily turns on/off a connection between the battery module and the generator, and the auxiliary relay secondarily turns on/off a connection the battery module and the generator;
    detecting an overcurrent between the battery module and the generator; and
    turning on the auxiliary relay and then turning off the main relay when the overcurrent is detected so that a limited current flows through a current limiting resistor.

7. The overcurrent protection method of claim 6, further comprising, when a current having a predetermined value or more during a predetermined time after the auxiliary relay turns on is detected, turning off the auxiliary relay.

8. The overcurrent protection method of claim 6, wherein the auxiliary relay is connected in parallel with the main relay, and wherein the current limiting resistor is connected in series with the auxiliary relay.

9. The overcurrent protection method of claim 6, wherein the current limiting resistor has a varying resistance.

10. The overcurrent protection method of claim 6, wherein the resistance of the current limiting resistor ranges from $10\Omega$ to $100\Omega$.

11. A battery pack comprising:
    a battery module including a plurality of secondary battery cells; and
    a battery managing module configured to monitor a recharging state of the battery module and protect damage due to an overcurrent from the battery module, wherein the battery managing module includes:
        a main relay configured to primarily turn on/off a connection between a battery module and a generator;
        an auxiliary relay configured to secondarily turn on/off a connection the battery module and the generator, the auxiliary relay connected in parallel with the main relay;
        a current limiting resistor connected in series with the auxiliary relay; and
        a controller configured to:
            detect an overcurrent and protect the battery module,
            turn on the main relay and turn off the auxiliary relay in a normal state where the battery module is recharged by the generator, and
            when the overcurrent is detected, turn on the auxiliary relay and turn off the main relay so that a limited current flows through the current limiting resistor.

12. The battery pack of claim 11, wherein when detecting a current having a predetermined value or more during a predetermined time after the auxiliary relay turns on, the controller is configure to turn off the auxiliary relay.

13. The battery pack of claim 11, wherein the current limiting resistor has a varying resistance.

14. The battery pack of claim 11, wherein the resistance of the current limiting resistor ranges from $10\Omega$ to $100\Omega$.

15. The battery pack of claim 11, wherein a capacity of the battery module ranges from 100 A to 300 A.

16. The battery pack of claim 11, wherein the battery managing module further includes a current sensor configured to measure a current flowing between the battery module and the generator.

* * * * *